US010762407B2

(12) United States Patent
Gold

(10) Patent No.: US 10,762,407 B2
(45) Date of Patent: Sep. 1, 2020

(54) COMPONENT INCORPORATING 3-D IDENTIFICATION CODE

(71) Applicant: General Electric Company, Schenectady, NY (US)

(72) Inventor: Scott Alan Gold, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/479,796

(22) Filed: Apr. 5, 2017

(65) Prior Publication Data
US 2018/0293476 A1  Oct. 11, 2018

(51) Int. Cl.
| | |
|---|---|
| G06K 19/06 | (2006.01) |
| B33Y 80/00 | (2015.01) |
| B33Y 10/00 | (2015.01) |
| B22F 5/04 | (2006.01) |
| B33Y 70/00 | (2020.01) |
| B22F 3/105 | (2006.01) |
| B29C 64/153 | (2017.01) |
| B28B 1/00 | (2006.01) |
| F01D 5/14 | (2006.01) |

(52) U.S. Cl.
CPC ...... *G06K 19/06159* (2013.01); *B22F 3/1055* (2013.01); *B22F 5/04* (2013.01); *B28B 1/001* (2013.01); *B29C 64/153* (2017.08); *B33Y 10/00* (2014.12); *B33Y 80/00* (2014.12); *F01D 5/147* (2013.01); *G06K 19/06037* (2013.01); *B33Y 70/00* (2014.12); *Y02P 10/295* (2015.11)

(58) Field of Classification Search
CPC .............. B29C 67/007; G06K 19/06159
See application file for complete search history.

(56) References Cited

U.S. PATENT DOCUMENTS

| | | | |
|---|---|---|---|
| 4,350,883 | A | 9/1982 | Lagarde |
| 4,806,740 | A | 9/1989 | Gold et al. |
| 5,313,193 | A | 5/1994 | Dubois et al. |
| 5,546,462 | A | 8/1996 | Indeck et al. |
| 5,825,933 | A * | 10/1998 | Hecht .................... G06K 7/143 382/243 |
| 6,337,122 | B1 | 1/2002 | Grigg et al. |
| 6,640,632 | B1 | 11/2003 | Hatanaka et al. |
| 6,850,592 | B2 | 2/2005 | Schramm et al. |

(Continued)

FOREIGN PATENT DOCUMENTS

| | | |
|---|---|---|
| CN | 101916387 B | 9/2012 |
| DE | 102014013139 A1 | 3/2016 |
| WO | WO2016109111 | 7/2016 |

OTHER PUBLICATIONS

Extended European Search Report and Opinion issued in connection with corresponding EP Application No. 18165444.3 dated Aug. 29, 2018.

*Primary Examiner* — Thien M Le
*Assistant Examiner* — Asifa Habib
(74) *Attorney, Agent, or Firm* — Dority & Manning, P.A.

(57) ABSTRACT

A component incorporating a 3-D identification code includes: a component body having an interior bounded by an exterior surface; and an identification code formed as a part of at least one of the interior and the exterior surface, the identification code including a plurality of cells arranged in a three-dimensional space, wherein each of the cells is configured to encode more than two possible values.

23 Claims, 8 Drawing Sheets

(56) References Cited

U.S. PATENT DOCUMENTS

| | | |
|---|---|---|
| 6,976,627 B1 | 12/2005 | Culp et al. |
| 7,148,448 B2 | 12/2006 | Earren, Jr. et al. |
| 7,199,367 B2 | 4/2007 | Favro et al. |
| 7,217,102 B2 | 5/2007 | Rockstroh et al. |
| 7,250,864 B2 | 7/2007 | Murofushi et al. |
| 7,584,833 B2 | 9/2009 | Howells |
| 7,602,963 B2 | 10/2009 | Nightingale et al. |
| 8,222,567 B2 | 7/2012 | Mathai et al. |
| 8,536,860 B2 | 9/2013 | Boenish |
| 8,935,286 B1 | 1/2015 | Westerman, Jr. et al. |
| 8,973,829 B2 | 3/2015 | Atkinson et al. |
| 8,985,471 B2 | 3/2015 | Freeman |
| 9,036,916 B2 | 5/2015 | Le |
| 9,074,927 B2 | 7/2015 | Singh et al. |
| 9,135,543 B2 * | 9/2015 | Lancaster-Larocque ............... G06K 19/06178 |
| 9,250,183 B2 | 2/2016 | Smith et al. |
| 9,311,652 B2 | 4/2016 | Farn et al. |
| 9,360,589 B1 | 6/2016 | Meinhold et al. |
| 9,400,910 B2 * | 7/2016 | Kumar ............... G06K 7/1426 |
| 9,414,891 B2 | 8/2016 | Kieser |
| 9,424,503 B2 | 8/2016 | Kieser |
| 9,798,903 B2 * | 10/2017 | Learmonth ............ G06K 19/06 |
| 2002/0126889 A1 | 9/2002 | Pikler et al. |
| 2005/0042764 A1 * | 2/2005 | Sailor ............... G01N 21/31 436/166 |
| 2007/0241177 A1 * | 10/2007 | Tuschel ............ G06K 19/06028 235/375 |
| 2008/0159529 A1 | 7/2008 | Aarts et al. |
| 2009/0286007 A1 | 11/2009 | Brancher |
| 2010/0176195 A1 * | 7/2010 | Kubota ............... G06K 19/14 235/380 |
| 2011/0188051 A1 * | 8/2011 | Stuck ............... A61K 9/2072 356/511 |
| 2012/0181329 A1 * | 7/2012 | Gratton ............... G06K 7/1417 235/375 |
| 2012/0183701 A1 | 7/2012 | Pilz et al. |
| 2013/0193214 A1 | 8/2013 | Margulis et al. |
| 2014/0205083 A1 | 7/2014 | Pryakhin et al. |
| 2014/0263674 A1 | 9/2014 | Cerveny |
| 2015/0147585 A1 | 5/2015 | Schwarze et al. |
| 2015/0242737 A1 | 8/2015 | Glazberg et al. |
| 2015/0269468 A1 * | 9/2015 | Butz ............... G06K 19/06037 235/462.11 |
| 2015/0308337 A1 * | 10/2015 | Marasco ............ G06K 19/06037 60/39.01 |
| 2015/0324677 A1 | 11/2015 | Talyansky et al. |
| 2016/0107764 A1 | 4/2016 | O'Kell et al. |
| 2016/0207345 A1 | 7/2016 | Farmer et al. |
| 2016/0253586 A1 | 9/2016 | Cook et al. |
| 2016/0260001 A1 * | 9/2016 | Flores ............... G06K 19/06159 |
| 2016/0283834 A1 | 9/2016 | Bobbitt, III |
| 2016/0298268 A1 | 10/2016 | Gallucci et al. |
| 2016/0306088 A1 | 10/2016 | Ouderkirk et al. |
| 2016/0307083 A1 | 10/2016 | Kumar et al. |
| 2016/0311164 A1 | 10/2016 | Miyano |
| 2017/0046548 A1 * | 2/2017 | Kamijo ............... G06K 1/121 |

\* cited by examiner

US 10,762,407 B2

COMPONENT INCORPORATING 3-D IDENTIFICATION CODE

BACKGROUND OF THE INVENTION

The present invention relates generally to additive manufacturing, and more particularly to methods for incorporating identification codes into additively manufactured components.

Additive manufacturing is a process in which material is built up layer-by-layer to form a component. Additive manufacturing is also referred to by terms such as "layered manufacturing," "reverse machining," "direct metal laser melting" (DMLM), "selective laser sintering" (SLS), stereolithography (SLA), and "3-D printing." Such terms are treated as synonyms for purposes of the present invention.

With the present rapid maturation of 3-D printing technology, more accurate printers and modeling tools are becoming commercially available at decreasing cost. One problem associated with this cost decrease is the ease of creating inexpensive replicas that can place inferior components in the market.

In some applications, for example gas turbine engines, particularly aircraft gas turbine engines, counterfeit parts pose a severe risk to engine integrity.

BRIEF DESCRIPTION OF THE INVENTION

This problem is addressed by the physical incorporation of a three-dimensional ("3-D") identification code into a component using additive manufacturing processes.

According to one aspect of the technology described herein, a component incorporating a 3-D identification code includes: a component body having an interior bounded by an exterior surface; and an identification code formed as a part of at least one of the interior and the exterior surface, the identification code including a plurality of cells arranged in a three-dimensional space, wherein each of the cells is configured to encode more than two possible values.

According to another aspect of the technology describe herein, a method of making a component incorporating a 3-D identification code includes: depositing a powder onto a worksurface; using radiant energy to fuse the powder; and repeating the steps of depositing and fusing the powder to build up the component in a layer-by-layer fashion, the component including a component body having an interior bounded by an exterior surface; and an identification code formed as a part of the interior, the identification code including a plurality of cells arranged in a three-dimensional space within the interior, wherein the cells are defined by varying position-independent properties.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
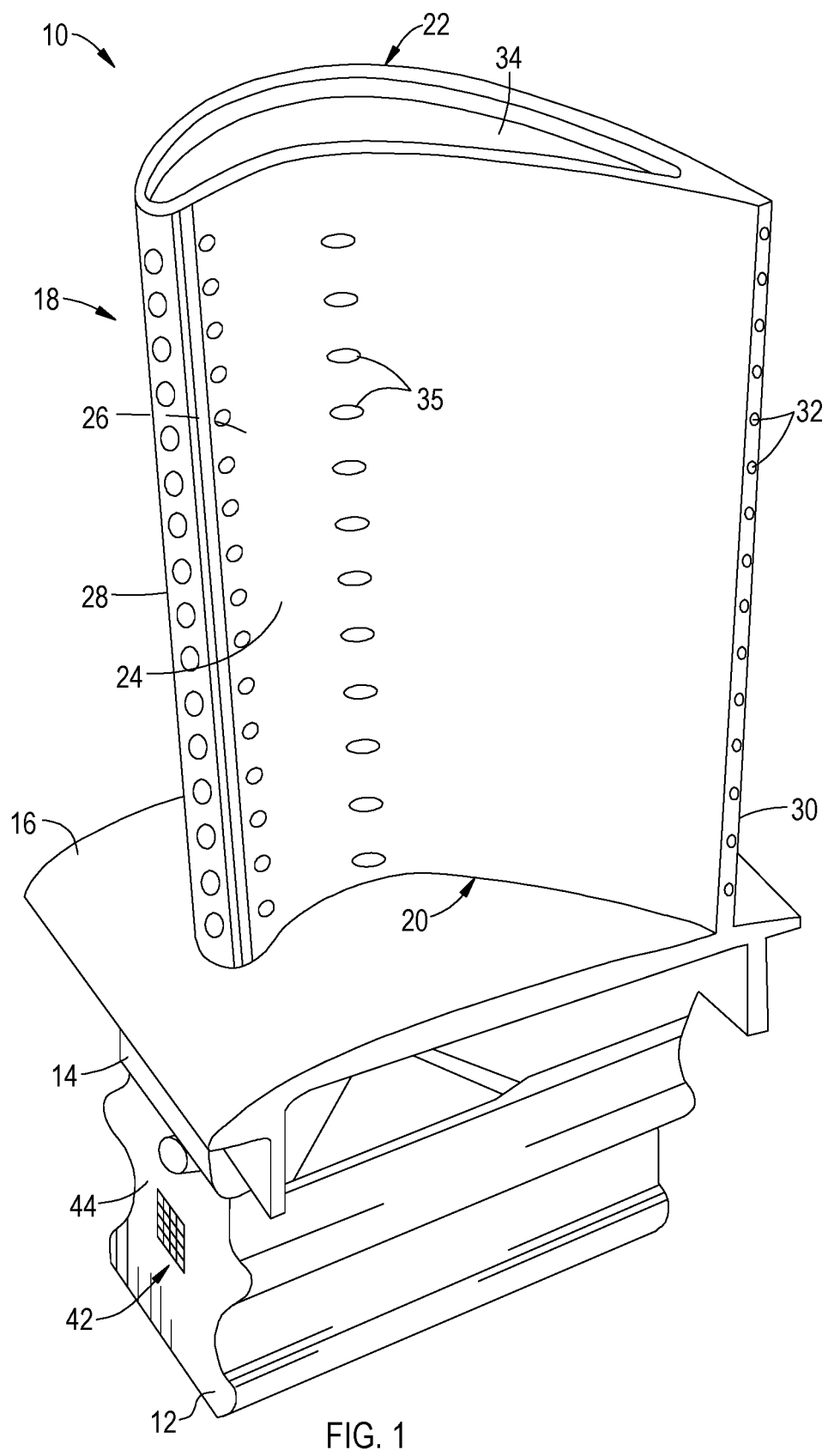
FIG. 1 is a schematic perspective view of a high-pressure turbine blade.

Referring to the drawings wherein identical reference numerals denote the same elements throughout the various views, FIG. 1 depicts an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 20 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 30. The airfoil 18 may take any configuration suitable for extracting energy from the hot gas stream and causing rotation of the rotor disk. By way of example and not of limitation, the turbine blade 10 may be formed from a suitable aerospace alloy, such as a nickel- or cobalt-based superalloy, which has acceptable strength at the elevated temperatures of operation in a gas turbine engine. The tip 22 of the airfoil 18 is closed off by a tip cap 34 which may be integral to the airfoil 18 or separately formed and attached to the airfoil 18.

Figure 2:
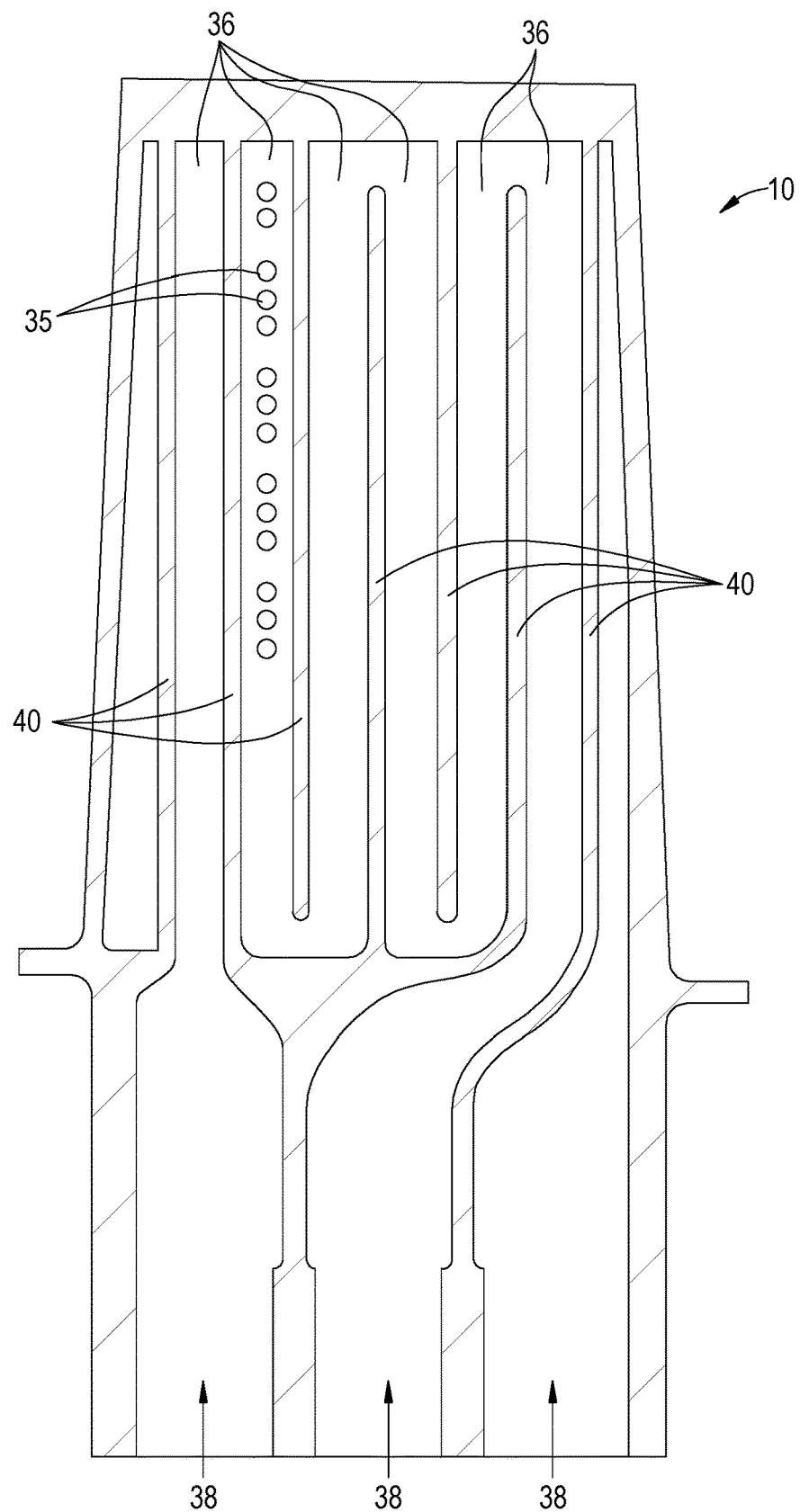
FIG. 2 is a cross-sectional view of the turbine blade of FIG. 1.

The airfoil 18 includes an internal cooling circuit which may have any conventional configuration, such as a serpentine circuit. FIG. 2 is a cross-sectional view of the turbine blade 10 showing an example of a suitable circuit. Within the turbine blade 10, a plurality of internal passages 36 direct a flow of cooling air. Each such passage 36 is connected at one end to a cooling air inlet 38 within the shank 14. The inlets 38 receive pressurized cooling air from a compressor of a gas turbine engine (not shown) in a conventional manner. At various locations along the passages 36 a plurality of cooling holes 35 of conventional size and configuration are positioned. These holes 35 provide a flowpath for cooling air inside passages 36 to the gas stream outside the blade 10. The airfoil 18 may incorporate a plurality of trailing edge cooling holes 32 (FIG. 1), or it may incorporate a number of trailing edge bleed slots (not shown) on the pressure side wall 24 of the airfoil 18. The internal passages 36 are defined by and separated from each other by a plurality of integral walls 40.

The turbine blade 10 may be described generally as including a body having an interior bounded by an exterior surface. The turbine blade is just one example of numerous components which may benefit from the inclusion of an identification code, on an exterior surface or within the interior of the body. Examples of such a code and its manufacture are described below.

Figure 3:
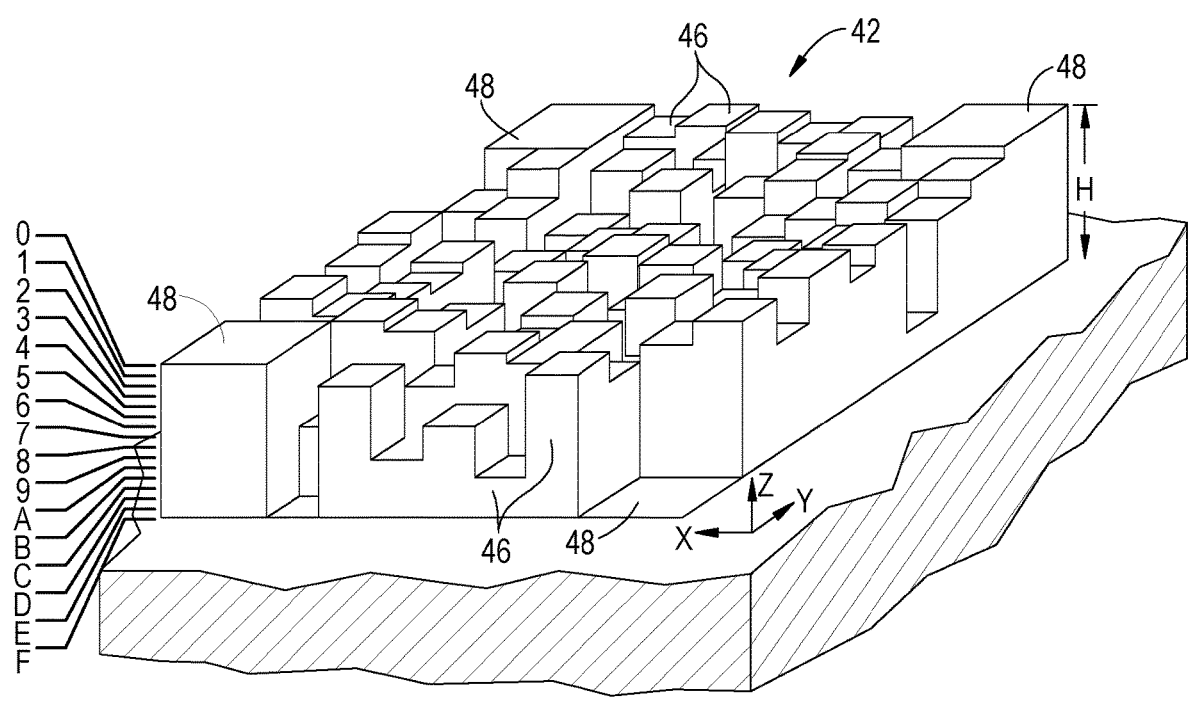
FIG. 3 is a schematic perspective view of an exemplary 3-D code.

FIG. 3 illustrates an exemplary code 42 incorporated into an exposed surface of a component such as the turbine blade 10 shown in FIG. 1. In the illustrated example, the code 42 is incorporated into a forward face 44 of the dovetail 12, but the code 42 may be formed on any surface where its presence does not affect the function of the component.

For the purposes of convenient description, reference will be made to X, Y, and Z axes, which are three mutually perpendicular directions. The code 42 comprises a plurality of cells 46 which are laid out in an array of predetermined dimensions in an X-Y plane. In the illustrated example, the cells 46 have a rectilinear shape and specifically are quadrilaterals; however any shape which is capable of being manufactured by an additive manufacturing process and scanned by a scanning device, such as a laser or optical scanner, may be used.

Each of the cells 46 encodes a data value by way of its height in the Z direction. It will be understood that a commercially available scanning device is able to resolve the Z-height of each cell 46 down to a certain minimum resolution. The code 46 has a predetermined overall maximum height in the Z-direction, labeled "H". The maximum height H is divided into a predetermined number of increments. In the illustrated example the height H is divided into 16 increments, in which case each cell 46 can encode one of 16 different unique values. These are shown as values 0-9 and A-F corresponding with hexadecimal values. The overall maximum height H and the number of increments may be selected taking into account the Z-direction resolution of the additive manufacturing machine used to create the code 42 as well as the Z-direction resolution of the scanning device used to read the code 42.

The code 42 is referenced to several datums 48 which describe the position, alignment, and scale of the code 42. In the illustrated example, the datums 48 comprise additional cells positioned at the far corners (i.e. distal corners) of the code 42. In the illustrated example, the datums 48 are identifiable as such by their increased size (i.e. surface area) relative to the other cells 46. They could also be identifiable by having a smaller size or a different shape. For example, three of the datums 48 are arranged in an L-shape. The angle of the L-shape identifies a reference corner of the code 42 and identifies the X- and Y-directions. The lengths of the legs of the L-shape identify the scale of the code 42.

The substantive content of the code 42 may include numerous types of information. Nonlimiting examples include any or all of the following kinds of information: manufacturer name, manufacturer location, manufacturing date, part number, part version, production batch number and/or series code, or serial number. Optionally, the code may include authentication information of arbitrary content relative to the component (e.g. plain or encrypted text, numbers, images, etc.) serving as a "watermark" to identify a genuine component.

The logic used for encoding the substantive content, or stated another way the symbolic relevance of each height increment value, may be selected to suit a particular application. For example, the height increment values may be correlated to numeric values, alphabetical values, alphanumeric values, or other systems of symbols.

Figure 4:
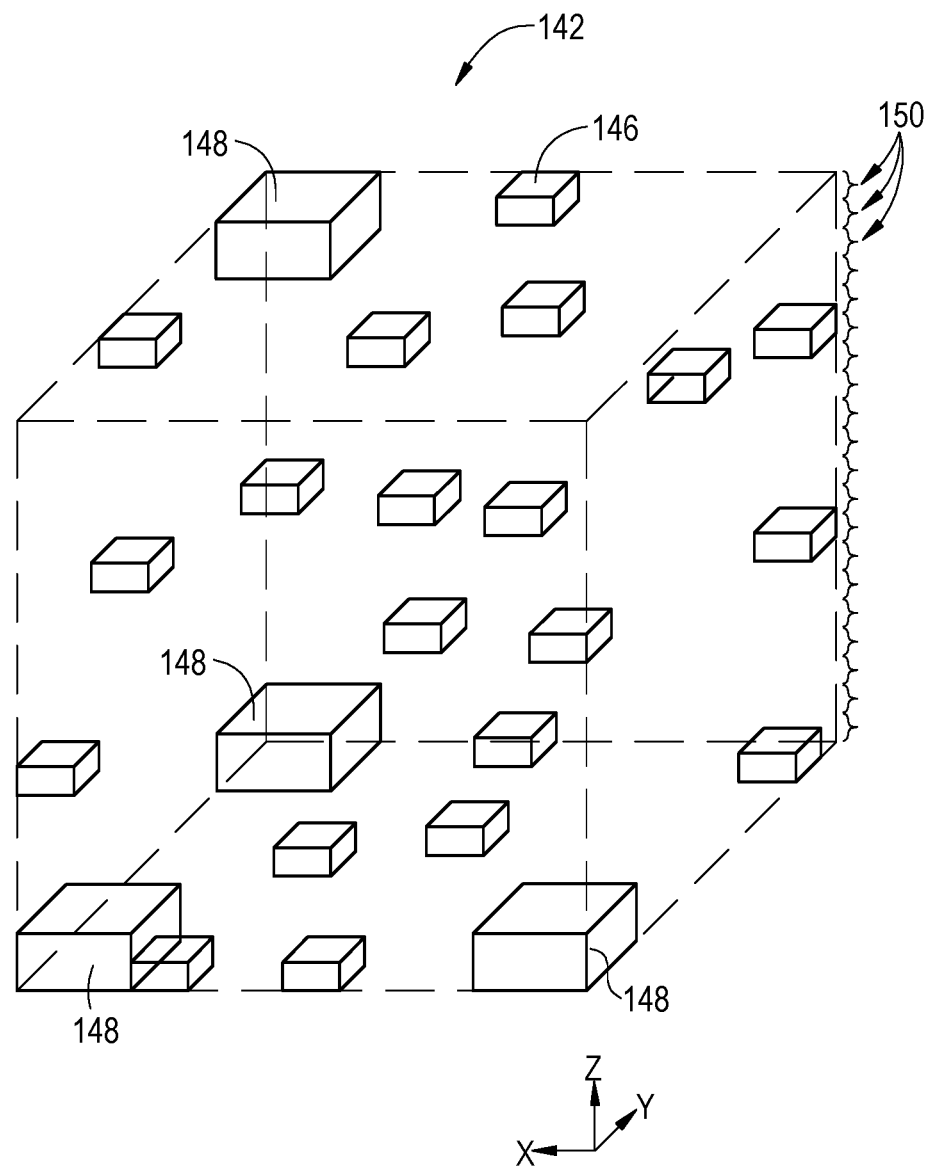
FIG. 4 is a schematic perspective view of an alternative 3-D code.

FIG. 4 illustrates an exemplary code 142 which may be incorporated into the body of a component such as the turbine blade 10 shown in FIG. 1. The illustrated example, the code 142 is incorporated into the airfoil portion 18.

For the purposes of convenient description, reference will be made to X, Y, and Z axes as described above. which are three mutually perpendicular directions. The code comprises a plurality of cells 146 which are laid out in an array of predetermined dimensions in an X-Y plane. In the illustrated example, the cells 146 have a rectilinear shape and specifically are parallelepipeds; however any shape which may be manufactured and identified by a scanning device may be used.

The cells 146 are identifiable by way of one or more position-independent properties. This refers to properties which may be identified by means of a nondestructive scanning device or process, such as computed tomography ("CT"). This type of process also provides the 3-D spatial resolution required to read the positions of the individual cells 146. One example of a position-independent property is the mass density of a particular cell 146. In the simplest implementation, the cells 146 would be identified by having, for example, a much greater density than the surrounding material. In this case each cell 146 is binary, encoding one of two values, e.g. a greater density material is either present or not present at a specific X, Y, Z position within the code 142.

The identifiable cells 146 may be used in different configurations to encode data. In the example shown in FIG. 4, each of the cells 146 encodes a data value by way of its binary value for its specific X, Y position. The code 142 comprises a number of layers 150, each of which is an independent 2-D code.

The code 142 is referenced to one or more datums 148 which describe the position, alignment, and scale of the code 142. In the illustrated example, the datums 148 are provided in the form of additional cells positioned at the far corners of the code 148. In the illustrated example, datums 148 are identifiable as such by their increased size (i.e. volume) relative to the other cells 148. They could also be identified by having a smaller size or a different shape. Collectively the datums 148 identify the X, Y, and Z directions and the scale of the code 148.

Figure 5:
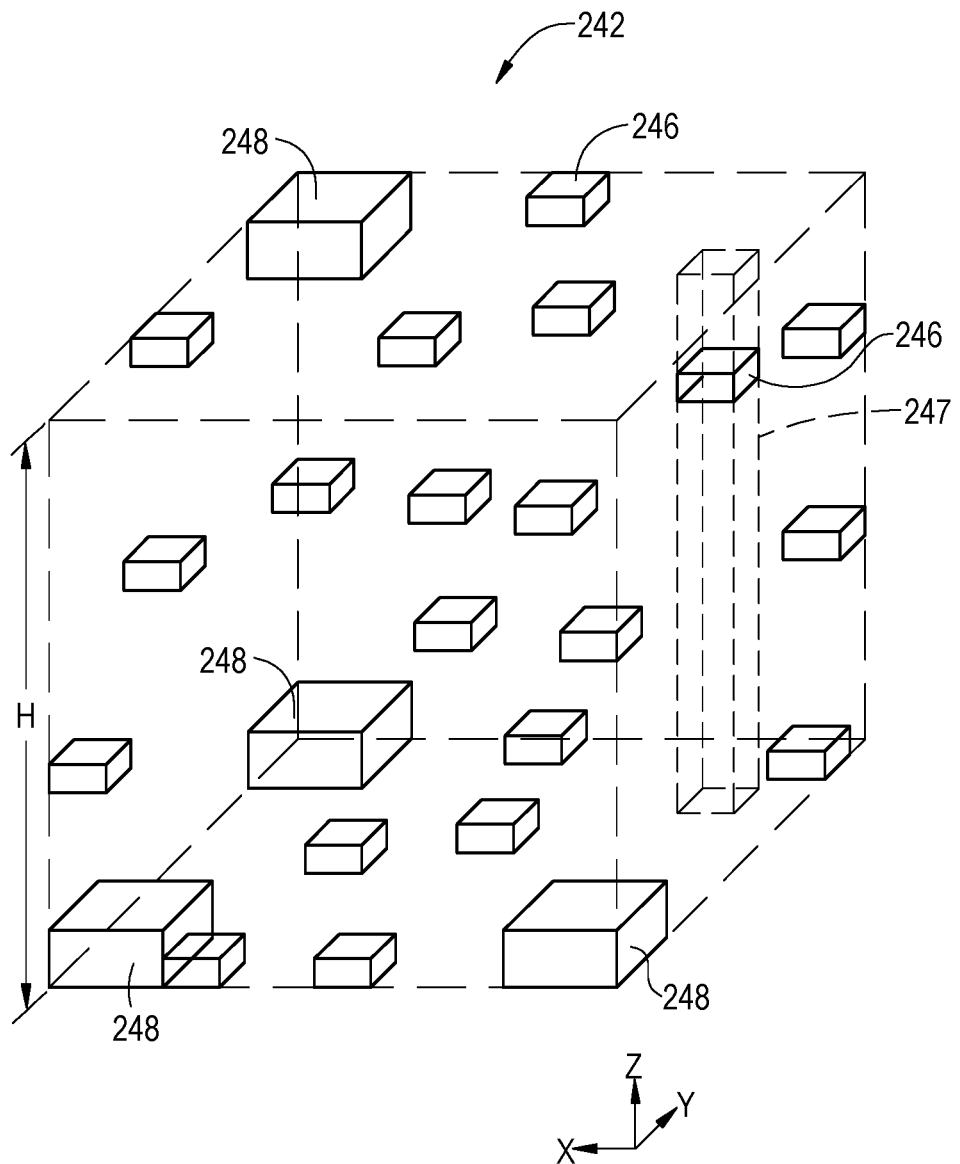
FIG. 5 is a schematic perspective view of an alternative 3-D code.

FIG. 5 shows an alternative code 242 which is divided into columns 247 (one example shown) which are laid out in an array of predetermined dimensions in an X-Y plane. The code 242 has a predetermined overall maximum height in the Z-direction, labeled "H". The maximum height H is divided into a predetermined number of increments; each column 247 comprises a number of cells 246 equal to the number of increments. For example the height H may be divided into 25 increments, in which case each column 247 contains 25 cells (capable of encoding $2^{25}$ combinations). The overall maximum height H and the number of cells 246 arrayed along the height H may be selected taking into account the Z-direction resolution of the additive manufacturing machine used to create the code 242 as well as the Z-direction resolution of the scanning device used to read the code 242. The code 242 is similar to the surface code 42 described above in that it is a single unitary code with each "column" (that is, each unique X-Y position) encoding multiple values.

Optionally, the cells 246 may encode multiple data values by way of one or more of the position-independent properties described above. One example of a position-independent property that can encode multiple values is the density of a particular cell 246. For example, several different materials with different densities ranked from low to high in a range may be identified. A specific cell may then be created from one of those identified materials. For example, if five different materials with unique densities are identified, each cell 246 could encode one of five different unique values. Alternatively, differences in material composition (i.e. alloy) detectable by means such as CT scanning or gamma ray scanning could be used as a basis for encoding multiple data values. Another example of a position-independent property that can encode multiple values is the porosity of a particular cell 246. For example, several different materials with different porosities ranked from low to high in a range may be identified. This same concept of encoding multiple data values using position-independent properties may be incorporated in the codes 42 or 142 described above.

The code 242 is referenced to one or more datums which describe the position, alignment, and scale of the code 242. In the illustrated example, the datums 248 are provided in the form of additional cells positioned at the far corners of the code 242. In the illustrated example, datums 248 are identifiable as such by their increased size (i.e. volume) relative to the other cells 248. They could also be identified by having a smaller size or a different shape. Collectively the datums 248 identify the X, Y, and Z directions and the scale of the code 248.

As described above for the surface code 42, the substantive content of the codes 142 or 242 may include numerous types of information. Furthermore the logic used for encoding the substantive content may be selected to suit a particular application as described above for the surface code 42.

Figure 6:
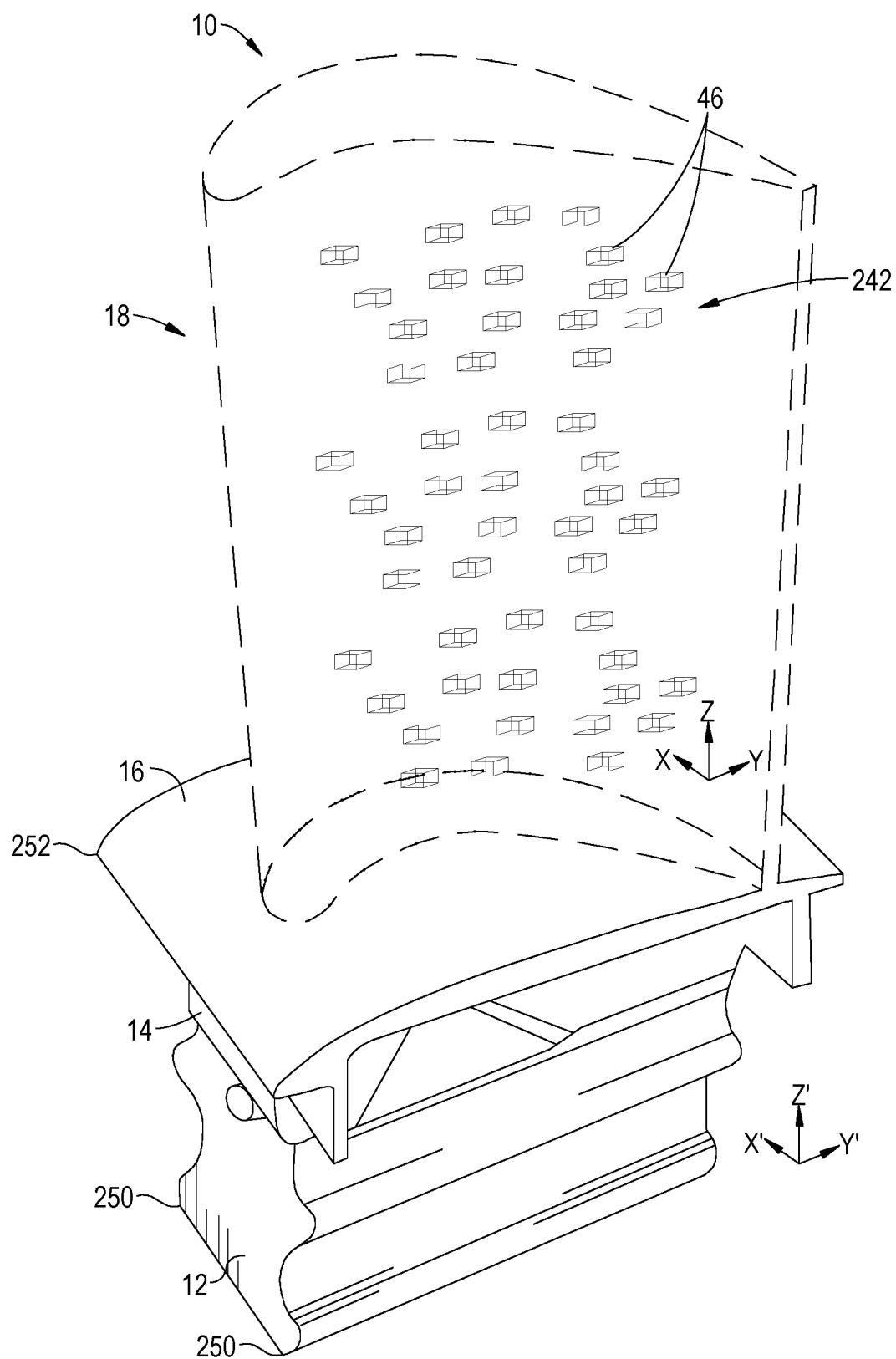
FIG. 6 is a schematic perspective view of a 3-D code incorporated into the body of a turbine blade.

The datums described above need not be incorporated directly into the codes 42, 142, 242. Optionally, the datums may be incorporated as part of the component. Using the turbine blade 10 and code 242 as an example, various existing elements may be used as datums. For example, referring to FIG. 6, two inboard front corners 250 of the dovetail 12 and one front corner 252 of the platform 16 are exterior features that could be readily located using commercially available scanning equipment. These points would be sufficient to constrain the position, orientation, and scale of the turbine blade 10. Once the location and distance between these points are known, this information may be matched to existing data, e.g. a computer-based solid model of the turbine blade 10. A coordinate system of the component X', Y', Z' may then be correlated to the coordinate system X, Y, Z of the code 242.

The codes 42, 142, 242 described above may be incorporated into the body of the turbine blade 10 or other component in any desired position and orientation that is consistent with the intended function of the component. Stated another way, the coordinate system X, Y, Z of the code 42, 142, 242 may be rotated and/or translated away from the coordinate system X', Y', Z', of the component.

This feature is especially helpful for avoiding counterfeit components, as a scan conducted without prior knowledge of the part-based datums would reveal no useful information. It is also possible that the code 42, 142, 242 would simply appear to be inclusions or defects in the component.

The codes described above are especially suitable for manufacturing as an integral part of the component as a whole. An additive manufacturing process such as powder-bed additive manufacturing process may be used. In the case of the surface code 42, any conventional type of additive manufacturing machine may be used. In the case of the interior codes 142, 242, is it helpful to use a machine which is capable of applying multiple different materials for each layer of a build.

Figure 7:
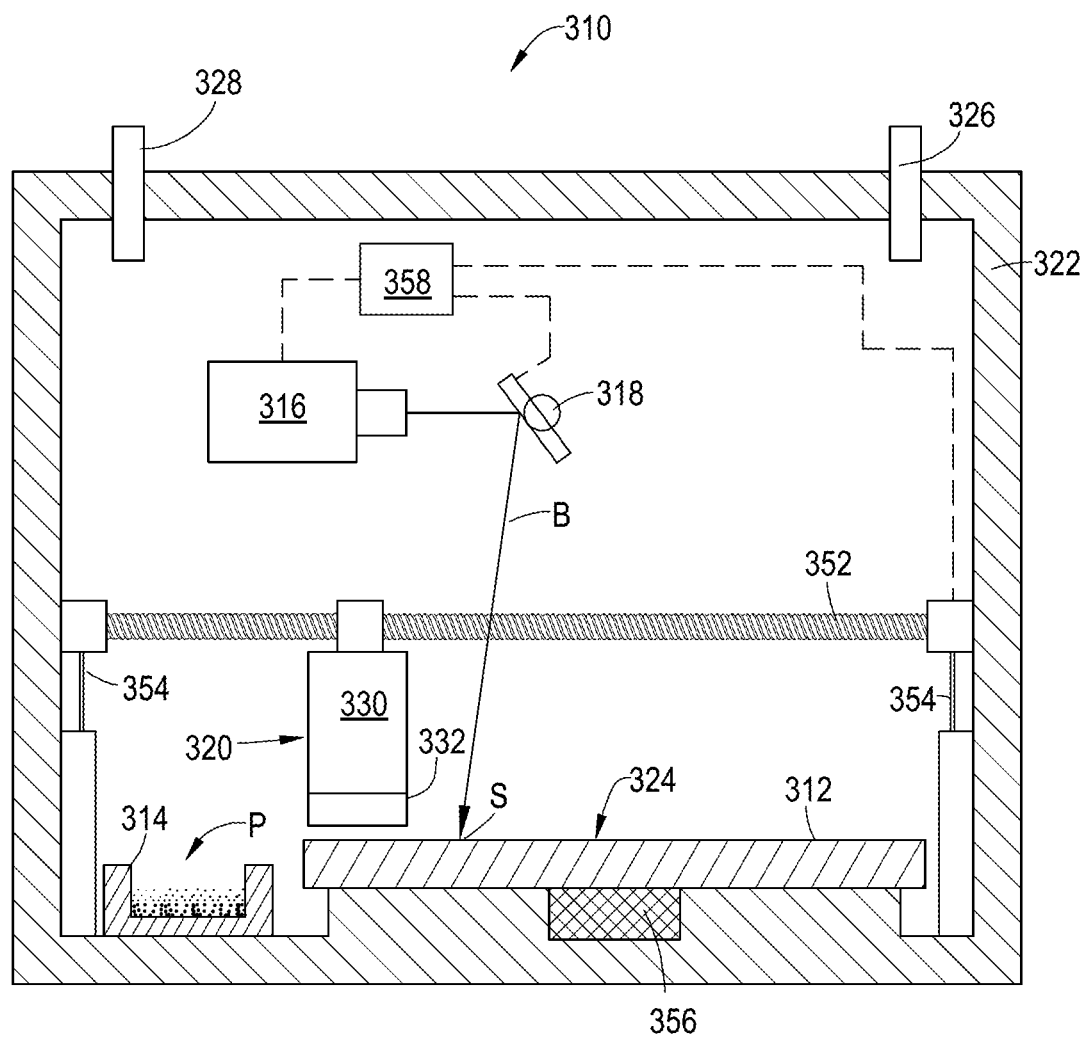
FIG. 7 is a schematic cross-sectional view of an exemplary additive manufacturing machine.
Figure 8:
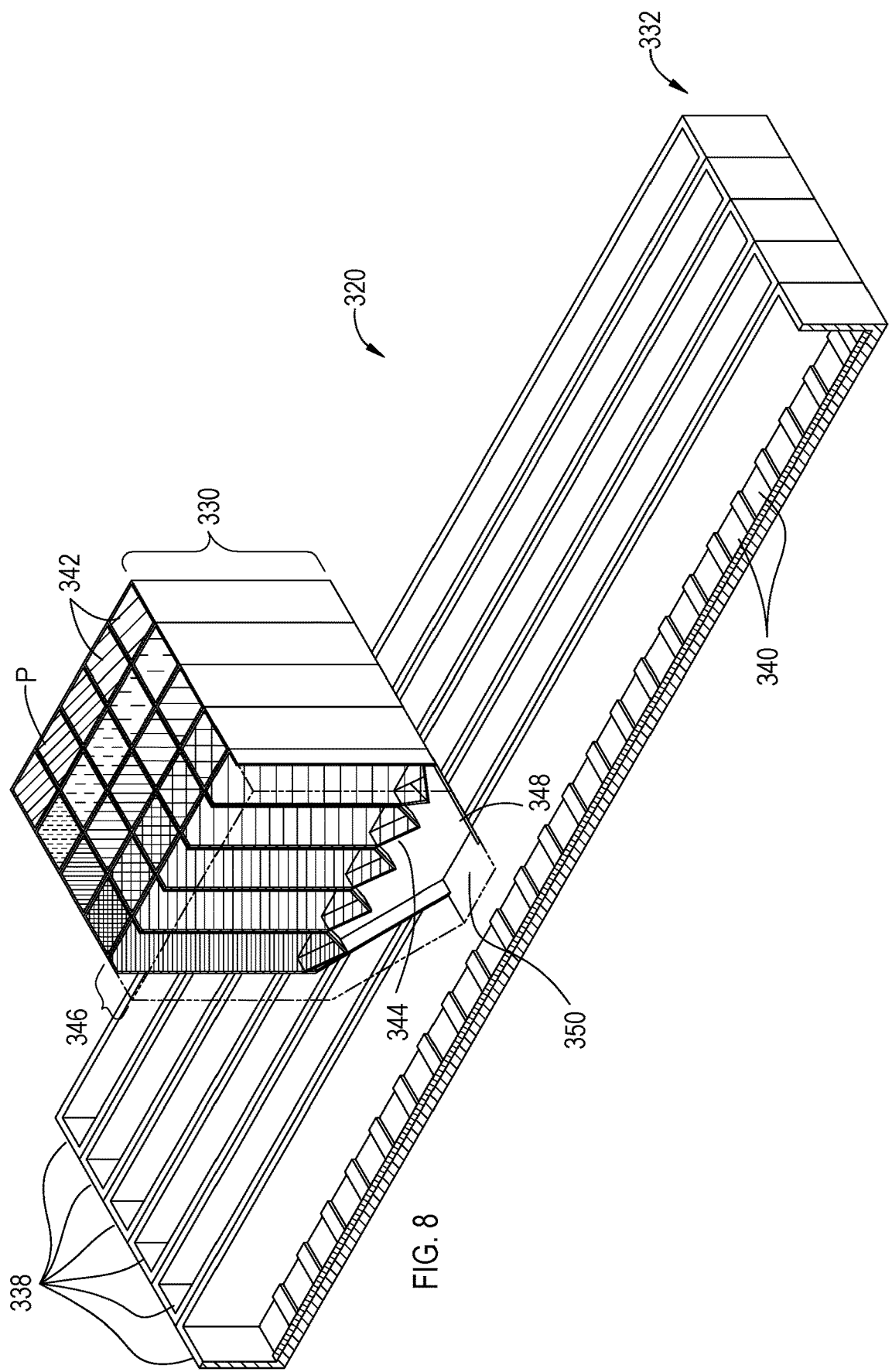
FIG. 8 is a schematic perspective view of a coater usable with the machine of FIG. 7.

FIGS. 7 and 8 illustrate schematically an exemplary additive manufacturing apparatus 310 suitable for carrying out an additive manufacturing process with multiple materials. The apparatus 310 may include a build platform 312, an excess powder container 314, a directed energy source 316, a beam steering apparatus 318, and a coater 320, all of which may be enclosed in a housing 322. Each of these components will be described in more detail below.

The build platform 312 is a rigid structure providing a planar worksurface 324. The excess powder container 314 is an open-topped vessel which lies adjacent to the build platform 312, and serves as a repository for excess powder P.

The directed energy source 316 is a device producing radiant energy with suitable power and other operating characteristics to melt and fuse the powder during the build process, described in more detail below. For example, the directed energy source 316 may comprise a laser or an electron beam gun.

The beam steering apparatus 318 functions so that a beam "B" from the directed energy source 316 can be focused to a desired spot size and steered to a desired position in a plane coincident with the worksurface 324. For example, it may comprise one or more mirrors, prisms, and/or lenses and provided with suitable actuators.

The housing 322 encloses the working components of the apparatus 310 and may be sealed to prevent contamination. The housing 322 may be purged with a gas or gas mixture through inlet and outlet ports 326 and 328, respectively.

As seen in FIG. 8, the coater 320 may include a reservoir assembly 330 positioned above a dispenser 332. A width of the dispenser 332 may be substantially equal to a width W of the build platform 312. The dispenser 332 includes one or more elongated troughs (designated 338 generally) extending parallel to the width. In the illustrated example, the dispenser 332 includes a plurality of troughs 338 in a side-by-side arrangement.

Each trough 338 includes one or more deposition valves 340. As used herein the term "valve" means any structure having a first position or condition which permits flow of powdered material (referred to as an "open" state), and a second position or condition which blocks flow of powdered material (referred to as a "closed" state). The action of the deposition valve 340 may be binary (i.e. on-off) or variable (i.e. open to a variable degree). Nonlimiting examples of suitable devices usable as deposition valves 340 include microelectromechanical system ("MEMS") devices or piezoelectric devices. In the illustrated example each trough 338 includes a linear array of deposition valves 340 extending along the width of the dispenser 332. The size of the deposition valves 340 (i.e. their flow area in the open state), the spacing between individual deposition valves 340, and the total number of deposition valves 340 may be selected in order to provide a desired spatial resolution and total coverage area. In use, the amount of powder deposited and resulting powder layer thickness may be controlled by the duration that the deposition valves 340 are open.

The reservoir assembly 330 includes at least one reservoir 342 disposed over each trough 338. Each reservoir 342 is defined by suitable walls or dividers forming a volume effective to store and dispense a powder P. Each individual reservoir 342 may be loaded with a powder P having unique characteristics, such as composition and/or powder particle size. It should be appreciated that the powder P may be of any suitable material for additive manufacturing. For example, the powder P may be a metallic, polymeric, organic, or ceramic powder. It is noted that the reservoir assembly 330 is optional and that powder P may be loaded directly into the troughs 338.

Each reservoir 342 may incorporate a feed valve 344 operable to selectively permit flow of powder P from the reservoir 342 into the associated trough 338. The structure of the feed valve 344 may be as described above for the deposition valves 340. The feed valves 344 may be used to selectively flow powder for various purposes, such as for limiting the amount of powder P in the trough 338 (to avoid interfering with operation of the deposition valves 340); or for mixing powders from several different reservoirs 342 together in one trough 338.

In the illustrated example, a group of reservoirs 342 are arranged in a side-by-side configuration extending parallel to the width W of the dispenser 332. For convenience of description this group may be referred to as a "column" 346. The reservoirs 342 within the column 346 are grouped above a funnel-shaped collector 348 with a single outlet 350 which discharges into the respective trough 338. One such column 346 and collector 348 may be provided for each trough 338. Alternatively, each reservoir 342 could be positioned to discharge directly into one of the troughs 338.

It is possible to arbitrarily load each reservoir 342 with a unique powder (e.g. a powder having a unique composition and/or particle size). It is also possible to load a group of reservoirs 342 with powders having at least one common property. For example, the reservoirs 342 of a particular column 346 could be loaded with several powders having the same composition but differing powder particle sizes in each individual reservoir 342.

The coater 320 is mounted for controlled movement relative to the build platform 312 in at least one axis parallel to the worksurface 324, such that powder can be dispensed over a selected area of the build platform 312. In the illustrated example, The width of the dispenser 332 is substantially equal to a width of the build platform 312, so no movement is required in the width direction in order to dispense powder in a specified location. The coater 320 is mounted to the housing 322 using a first actuator 352 permitting controlled movement in the "length" direction. The first actuator 352 is depicted schematically in FIG. 7.

Optionally, the coater 320 may include apparatus for controlled movement relative to the build platform 312 perpendicular to the worksurface 324 (i.e. height) so as to control the distance between the coater 320 and the worksurface 324. A second actuator 354 is shown schematically for this purpose. Relative movement in the height direction could be produced by movement of the coater 320, the build platform 312, or some combination of the two.

Optionally, the apparatus may include a vibrator 356 operable to vibrate the build platform 312 and level deposited powder, as described in more detail below. For example, an electromechanical vibrator may be used for this function.

The functions of the apparatus 310 may be implemented using an electronic controller 358 depicted schematically in FIG. 7. For example, one or more processor-based devices such as a microcomputer or programmable logic controller ("PLC") may be used for this purpose. Functional connections of the controller 358 to the other components of the apparatus 310 are shown as single dashed lines.

The apparatus 310 described above is operable to produce a layered component comprising fused powder, where the coater 320 can be used to deposit powder having specified characteristics at each specified location within a layer.

Subsequent to deposition, the directed energy source 316 is used to melt the deposited powder, which may correspond to a two-dimensional cross-section of the component being built. The directed energy source 316 emits a beam "B" and the beam steering apparatus 318 is used to steer the focal spot "S" of the beam B over the exposed powder surface in an appropriate pattern. The exposed layer of the powder P is heated by the beam B to a temperature allowing it to melt, flow, and consolidate. This step may be described as "fusing" the powder P. After a layer is fused, the coater 320 is moved vertically apart from the build platform 312 by a layer increment, and another layer of powder deposited as described above. The directed energy source 316 again emits a beam B and the beam steering apparatus 318 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer. This cycle of applying powder P and then laser melting the powder P is repeated until the entire component C is complete.

The 3-D codes described herein have several advantages over prior art identification methods. The 3-D codes provides a means of ensuring that parts created through additive manufacturing cannot be duplicated by an unauthorized third party and passed off as genuine parts. The codes are not readily visible to reverse engineering methods. Finally, 3-D codes provide greater information density than 2-D surface identifiers (e.g. bar codes or QR codes).

The foregoing has described a component incorporating a 3-D identification code and a method for its manufacture. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A component incorporating a 3-D identification code, comprising:
    a component body having an interior completely bounded by an exterior surface; and
    an identification code formed as a part of the interior, the identification code including a plurality of cells arranged in a three-dimensional space, at least one cell of the plurality of cells arranged within the interior, wherein a portion of the plurality of the cells are arranged in a two-dimensional array defining perpendicular first and a second dimensions, wherein the code defines a third dimension perpendicular to both the first and second dimensions, wherein each of the cells is configured to encode more than two possible values, and wherein the identification code comprises a plurality of stacked layers, the each cell of the plurality of cells associated with one of the layers of the plurality of layers, each layer of the plurality of layers oriented along the first and second dimensions such that each layer defines an independent two-dimensional code of cells.

2. The component of claim 1 wherein at least one cell of the code is formed on the exterior surface.

3. The component of claim 1 wherein each cell has a variable height in the third dimension.

4. The component of claim 1 wherein the identification code includes a plurality of datums, each datum of the plurality of datums positioned at a corner of the identification code such that a minimum and maximum position along each dimension is represented by the plurality of datums, and wherein the plurality of datums are configured to identify a size, position, or orientation of the identification code.

5. The component of claim 4 wherein the plurality of datums comprises one or more additional cells disposed at predetermined locations relative to the two-dimensional array.

6. The component of claim 5 wherein at least one datum of the plurality of datums is identifiable by having a different size or shape than the other cells.

7. The component of claim 4 wherein at least one datum of the plurality of datums comprises an identifiable structural feature of the body.

8. The component of claim 4 wherein the body defines a portion of a gas turbine engine.

9. The component of claim 1 wherein each cell encodes more than two possible values by way of a position of the cell along at least one dimension of the three-dimensional space.

10. The component of claim 1 wherein each cell encodes more than two possible values by way of a position-independent property of the cell.

11. The component of claim 1 wherein each cell of the plurality of cells is disposed in the interior of the body.

12. The component of claim 11 wherein the cells are identifiable by one or more position-independent properties.

13. The component of claim 11 wherein the identification code includes a plurality of datums, each datum of the plurality of datums positioned at a corner of the identification code such that a minimum and maximum position along each dimension is represented by the plurality of datums, and wherein the plurality of datums are configured to identify a size, position, and orientation of the identification code.

14. The component of claim 13 wherein the plurality of datums comprises one or more additional cells disposed at predetermined locations relative to the code.

15. The component of claim 14 wherein at least one datum of the plurality of datums is identifiable by having a different size or shape than the other cells.

16. The component of claim 13 wherein the datum comprises an identifiable structural feature of the body.

17. The component of claim 11 wherein each cell encodes more than two possible values by way of a position of the cell along at least one dimension of the three-dimensional space.

18. The component of claim 11 wherein each cell encodes more than two possible values by way of a position-independent property of the cell.

19. The component of claim 11 wherein the body defines a portion of a gas turbine engine.

20. The component of claim 11 wherein the code is configured as a single three-dimensional code.

21. A method of making a component incorporating a 3-D identification code, comprising:
    depositing a powder onto a work surface;
    using radiant energy to fuse the powder; and
    repeating the steps of depositing and fusing the powder to build up the component in a layer-by-layer fashion, the component including a component body having an interior completely bounded by an exterior surface; and an identification code formed as a part of the interior, the identification code including a plurality of cells arranged in a three-dimensional space, at least one cell of the plurality of cells arranged within the interior, wherein a portion of the plurality of the cells are arranged in a two-dimensional array defining perpendicular first and a second dimensions, wherein the code defines a third dimension perpendicular to both the first and second dimensions, at least two cells displaced from each other in each of the three dimensions such that the identification code comprises a plurality of stacked layers, the each cell of the plurality of cells associated with one of the layers of the plurality of layers, each layer of the plurality of layers oriented along the first and second dimensions such that each layer defines an independent two-dimensional code of cells, wherein the cells are defined by varying position-independent properties.

22. The method of claim 21 wherein the cells have varying porosity.

23. The method of claim 21 wherein the cells have varying composition.

\* \* \* \* \*